United States Patent [19]

Wessel

[11] Patent Number: 4,583,766
[45] Date of Patent: Apr. 22, 1986

[54] SECURE BADGE FOR INFRARED BADGE READER AND PROCESS FOR MAKING SAME

[75] Inventor: Kenneth R. Wessel, 26 Beech St., White Plains, N.Y. 10604

[73] Assignee: Kenneth R. Wessel, WhitePlains, N.Y.

[21] Appl. No.: 608,144

[22] Filed: May 8, 1984

[51] Int. Cl.⁴ .............................................. B42D 15/00
[52] U.S. Cl. ........................................ 283/88; 350/1.1
[58] Field of Search ................... 350/1.1, 1.6; 283/88, 283/87, 107–110

[56] References Cited

U.S. PATENT DOCUMENTS

| 3,455,577 | 7/1969 | Kikumoto | 283/107 |
| 3,640,009 | 2/1972 | Komiyama | 283/88 |
| 3,802,101 | 4/1974 | Scantlin | 283/87 |
| 3,871,119 | 3/1975 | Mayer | 283/109 |
| 3,919,447 | 11/1975 | Kilmer, Jr. et al. | 283/88 |
| 4,119,361 | 10/1978 | Greenaway | 283/88 |
| 4,222,662 | 9/1980 | Kruegle | 283/88 |
| 4,469,725 | 9/1984 | Fischer et al. | 283/87 |

Primary Examiner—Bruce Y. Arnold
Attorney, Agent, or Firm—Anthony J. Casella; Gerald D. Hespos

[57] ABSTRACT

An improved security badge is provided for use with an infrared badge reader. The badge is formed from a plurality of layers of PVC film which are laminated under appropriate conditions of heat and pressure to form an integral member. An infrared blocking material is disposed intermediate two of the layers. The non-blocking portions of the badge transmit between 0.90% and 1.25% infrared light.

15 Claims, 5 Drawing Figures

SECURE BADGE FOR INFRARED BADGE READER AND PROCESS FOR MAKING SAME

BACKGROUND OF THE INVENTION

Badge readers are used to control access to certain areas and to restrict the use of certain pieces of equipment such as machinery, computers or vehicles. The badge reader may be adapted to read a magnetic code placed on a badge or to optically detect certain coded information placed on or in the badge.

Frequently it is desirable to maintain an extremely secure access control system. Badges and badge readers that rely exclusively on magnetically encoded data generally are undesirable if security is a major factor because the magnetic information can readily be decoded or altered. Similarly, badge readers that read visible symbols such as numbers, letters or bar codes also cannot be relied upon exclusively when security is a major consideration, because the code can readily be observed, copied and/or altered.

Many electro-optical badge reading devices have been developed which rely upon passing visible light through apertures in a badge. Such devices are shown in U.S. Pat. No. 4,114,028 which issued to Baio et al on Sept. 12, 1978 and is entitled OPTICAL PUNCHED CARD READER; U.S. application Ser. No. 337,490 filed Jan. 6, 1982 by Kenneth R. Wessel and entitled CARD READER WITH AIR PASSAGE CLEANING STRUCTURE; U.S. application Ser. No. 356,046 filed Mar. 8,1982 by Berezowski and entitled ELECTRO-OPTICAL BADGE READER; and U.S. Pat. No. 4,423,317 which issued to Berezowski et al on Dec. 27, 1983 and is entitled MICRO CARD READER. The above identified United States Patents and patent applications are assigned to the assignee of the subject invention. While the electro-optical card readers identified and disclosed in the above cited references are desirable in many instances, they do not provide the high levels of security that often are required. Specifically, the pattern of apertures in a badge can readily be copied or altered thereby affecting the access that is intended to be controlled by the card reader.

Electro-optical card readers have been developed which employ infrared or ultraviolet light that is not visible to the human eye. More particularly, the typical badge for use with an infrared badge reader will be entirely opaque to visible light, but will include portions that are transparent to infrared light. The portions of the badge which transmit infrared are strategically located to define a code that can be read by the appropriate infrared badge reader. Since the entire badge is opaque to visible light, the code cannot readily be determined, copied or altered.

One badge for use with infrared badge readers is shown in U.S. Pat. No. 4,222,662 which issued to Kruegle. The badge shown in U.S. Pat. No. 4,222,662 includes a plurality of layers which are laminated in face to face contact. One of the inner layers includes a code formed from a material which is capable of blocking infrared light. The code shown on the card in U.S. Pat. No. 4,222,662 is disposed between a reflecting surface and a filter which is opaque to visible light but transparent to infrared light. Thus, infrared light is directed through the filter and the code carrying layer, and is reflected off the reflecting material. A read-out device then can assess the coded information as received from the reflective layer in the form of infrared light.

Another card for use with an infrared card reader is shown in U.S. Pat. No. 4,119,361 which issued to Greenaway. The card of U.S. Pat. No. 4,119,361 includes optical markings sandwiched between two protective layers which are transparent to infrared red light but opaque to visible light. The encoded data is printed with very fine lines so as to provide 300 lines per millimeter. This precisely coded data cannot readily be reproduced on infrared photocopying equipment. Additionally, the coded information is so fine that if one or more protective layers is removed from the card, the coded information is likely to be destroyed.

German Auslegeschrift No. 2,856,279 is directed to an identification marker having several layers one of which includes an infrared code. At least a portion of the marker will be destroyed if an attempt is made to delaminate the marker by using water.

European Pat. No. 31-525 also is directed to a multiple layer card with an infrared readable code sandwiched between two covering layers which are bonded together over their entire adjoining surfaces. These covering layers are opaque to visible light and may be formed from PVC foil.

Although the above described infrared badges generally perform well, badges produced from layers that are adhesively bonded to one another often are difficult to manufacture and in certain instances can be delaminated. More particularly, the adhesives must be carefully selected and their use carefully monitored to insure that the adhesive does not affect the code or the adjacent layers. This precise application of adhesive adds time and costs to the manufacturing of such badges. It also is frequently possible to delaminate the adhesively bonded layers to thus expose the code. Attempts to prevent such delamination generally adds significantly to the manufacturing costs. For example, the use of additional reactive layers as taught by Auslegeschrift No. 2856279 or the use of extremely fine codes as taught by U.S. Pat. No. 4,119,361 would significantly add to the cost of each card.

Accordingly it is an object of the subject invention to provide a badge for use with an infrared badge reader which provides enhanced security.

It is another object of the subject invention to provide a badge for use with an infrared badge reader which can be manufactured easily and inexpensively.

It is an additional object of the subject invention to provide a secure badge that cannot be delaminated.

It is of further object of the subject invention to provide a secure badge that does not require adhesives.

It is still an additional object of the subject invention to provide a badge which does not include dissimilar layers of material.

SUMMARY OF INVENTION

The subject invention is directed to a badge which is adapted to be used with an infrared badge reader and which provides enhanced levels of security with simple low cost manufacturing. The badge is formed from at least two layers of polyvinylchloride (PVC). The layers of PVC are of different colors. Additionally the thicknesses of the layers are selected to precisely control the amount of various wavelengths of light that may be transmitted through the layers separately and when they are laminated together.

A code is imprinted on one of the layers utilizing an ink which is substantially opaque to infrared light. More particularly as explained further below, the ink preferably should transmit less than 0.08% of the infrared light at 930–950 nanometers (nm). The infrared blocking ink is strategically disposed on one of the PVC layers so as to form a code that can be read by the badge reader.

The layers of PVC material are laminated to one another under controlled conditions of heat and pressure such that the ink imprinted code is disposed intermediate two of the layers. This lamination is carried out without the use of adhesive. As a result, the PVC layers are joined to form a single integral sheet of PVC material that cannot be separated.

Security is further enhanced by selecting PVC colors and thicknesses that will yield a badge that is both thin and transmissive to no more light than is required to be detected by the infrared badge reader. The thinness of the badge makes the badge virtually impossible to slice or otherwise dismember in an attempt to determine the code. Additionally, the low and controlled levels of transparency makes the badge virtually impossible to read under all but the most sophisticated infrared readout devices such as those incorporated into the badge reader. Specifically, the badge cannot be read under extremely bright light conditions which had been possible with certain of the above described prior art badges. As explained further below, this desired degree of security is achieved by selecting colors and thicknesses for the PVC layers that transmits between 0.9% and 1.5% of light in the 930–950 nm range. Furthermore, the security is further achieved by producing the integral badge with a thickness of no more than 45 mils.

As explained further below, the security objectives can be achieved by employing alternating blue, red and white layers of PVC material laminated to one another by the appropriate application of heat and pressure. The resultant card is an integral structure that cannot readily be delaminated or otherwise dismembered to reveal the code. In this structure, the ink imprinted code is disposed intermediate the red and blue layers. The white layer although somewhat less opaque, does contribute to the overall opacity of the card and provides a convenient surface for imprinting other identification information such as the name of the corporation or individual user.

DETAILED DESCRIPTION OF THE PREFERRED EMBODIMENT

Figure 1:
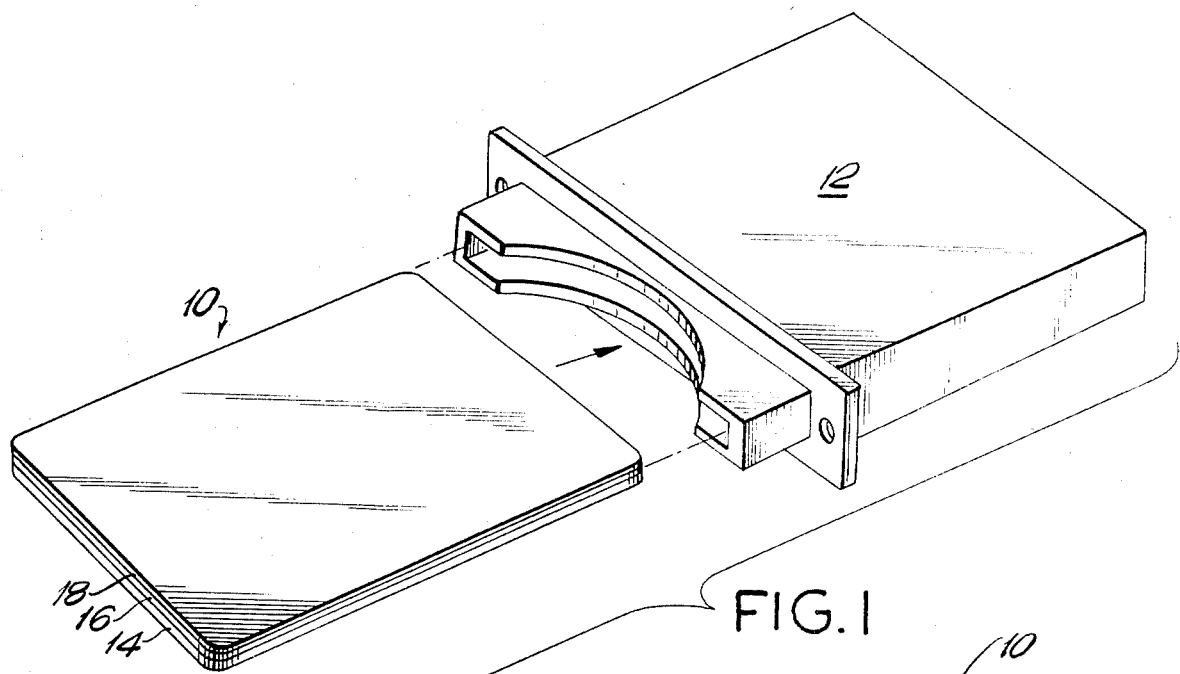
FIG. 1 is a perspective view of the badge of the subject invention used with a badge reader.

The badge of the subject invention is indicated generally by the numeral 10 in FIG. 1. The badge 10 is adapted for use in an infrared badge reader 12. The badge reader 12 includes a plurality of infrared light emitting diodes (IRED's) and a corresponding array of photoelectric cells which are sensitive to the infrared light. As explained in greater detail below, the card 10 includes an internal code formed by a pattern of infrared blocking material. As the badge 10 is inserted into the badge reader 12, the pattern of infrared blocking material in the badge 10 is read by the array of IRED's and the corresponding array of photoelectric cells.

Figure 2:
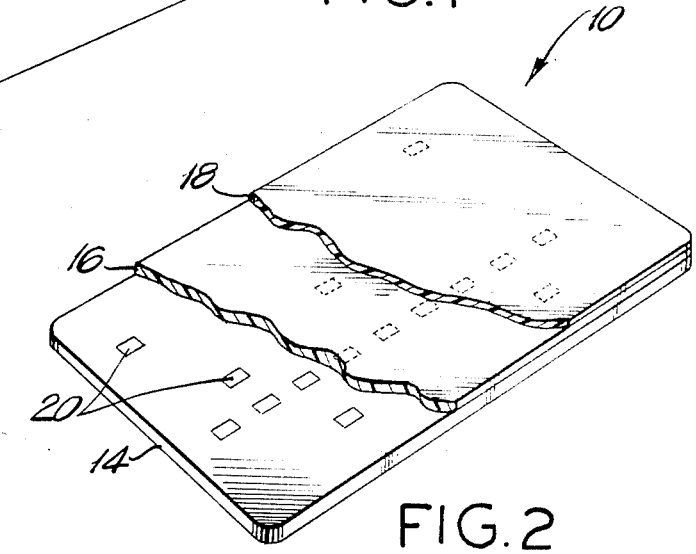
FIG. 2 is a perspective view, partly in section, of the badge of the subject invention.
Figure 3:
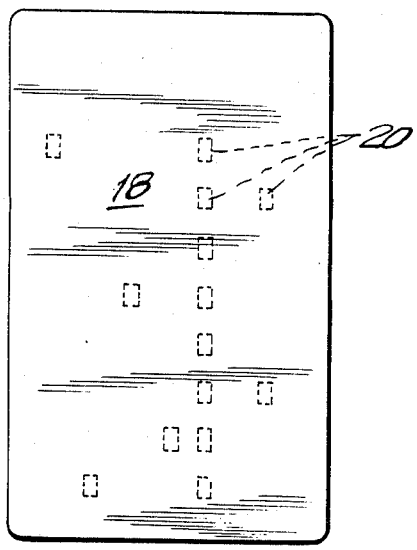
FIG. 3 is a plan view of the badge shown in FIG. 2.

The badge 10, as shown in FIG. 2, is formed from three distinct but integral layers 14, 16 and 18 of polyvinylchloride (PVC) material. More particularly, the card 10 includes a bottom layer 14 of blue PVC material, an inner layer 16 of red PVC material, and a top layer 18 of white PVC material. The layers 14, 16 and 18 are laminated to one another by the appropriate application of heat and pressure as explained below. The characteristics of PVC are such that the heat and pressure lamination of layers 14, 16 and 18 creates an integral member. Thus, the card 10 cannot be delaminated into its initial layers 14, 16 and 18. Additionally, as noted below, the process of manufacturing a card can be carried out simply and inexpensively without the use of adhesives.

The colors and thicknesses of the respective layers 14, 16 and 18 are selected to keep the amount of light capable of passing through the badge 10 to a selected minimum. Additionally, the colors and thicknesses of the layers 14, 16 and 18 are selected to provide to the badge 10 a narrow profile which makes any attempted disassembly of the badge 10 very difficult. More particularly, with respect to light transmission, it has been found desirable to construct the card such that it will transmit between 0.90% and 1.25% of the infrared light in the range of 930–950 nm. This range is based upon the findings that at levels of infrared transmissions significantly above the previously cited 1.25%, it is possible to detect a hidden code upon subjecting the card to an extremely bright light. It also has been found that transmission of less than 0.90% infrared light may result in errors by the badge reader. The most desirable results were obtained with badges that transmit less than 1.20% of the infrared light between 930–950 nm and specifically badges that transmit approximately 1.00% of the infrared light between 930–950 nm.

The preferred thickness for the card 10 is no more than 50 mils, with thinner cards being more desirable. Thin cards, such as these are easier to carry, are less costly, and also make mechanical separation of the various layers more difficult to accomplish. The preferred range for thicknesses of the badge is between 35 and 45 mils.

Figure 4:
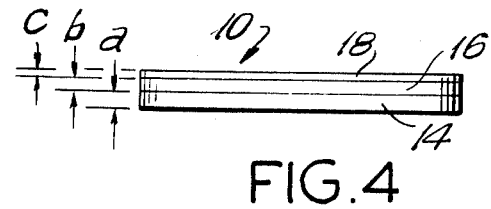
FIG. 4 is an end view of the badge shown in FIG. 2.

The blue layer 14, red layer 16 and white layer 18, as shown in FIGS. 2 and 4 enable the manufacturer of a badge having a thickness of approximately 42.5 mils which transmits only approximately 1.00% of the infrared light in the range of 930–950 nm. The card 10 which achieves these overall thickness and transmission limitations includes a bottom layer 14 having a thickness of approximately 20 mils as indicated by dimension "a" in FIG. 4. The bottom layer 14 is formed from a blue PVC material which transmits between 8.0 and 8.8% of infrared light at 930–950 nm. The inner layer 16 of card 10 has a thickness of approximately 15 mils as indicated by dimension "b" in FIG. 4. The inner layer 16 as formed from a red PVC material which transmits between 30% and 35% of infrared light at 930–950 nm. Finally, the top layer 18 has a thickness of 7.5 mils as indicated by dimension "c" in FIG. 4. The top layer 18 is formed from a white PVC material which transmits between 5.0 and 5.5% infrared light at 930–950 nm.

The composite badge 10, as described above, transmits only approximately 1% of the infrared light at 930–950 nm. Additionally, the white top layer 18 provides a convenient surface for printing appropriate employer or employee identification information. Although the badge 10 is described as having a bottom layer 14 which is formed from blue PVC and an inner layer 16 formed from red PVC, it is possible to reverse these two colored layers. Thus, in an alternate embodiment the above described 20 mil thick blue PVC layer could be disposed intermediate the 15 mil thick red PVC layer and the 7.5 mil thick white PVC layer.

The coded data are disposed intermediate the bottom and inner layers 14 and 16 of card 10. The coded information preferably is formed by a super opaque black silk screening ink that will transmit less than 0.08% infrared light at 930-950 nm. A preferred ink identified as GBYL-8100 is manufactured by Union Ink Company, Inc. The ink may be imprinted either upon the surface of bottom layer 14 which faces the inner layer 16, or the surface of the inner layer 16 which faces the bottom layer 14. The ink should not be imprinted upon the upwardly facing surface of inner layer 16, since this could conceivably enable the visual detection of the code through the thin white upper layer 18.

The ink indicia 20 may define any desired pattern, and preferably is arrayed in standard Hollerith pattern, because of the compatability of this pattern with the standard badge readers. Although any pattern of ink marks 20 may be employed, it is essential that the marks 20 be spaced inwardly from the perimeter of the badge 10 to prevent the visual detection of at least a portion of the code along the perimeter of the badge 10. Additionally, the PVC layers 14 and 16 will not merge with one another at locations where the ink marks 20 are present. Thus, it is essential that each ink mark 20 be completely surrounded by the PVC material of badge 10. Additionally, the absence of a strong bond between layers 14 and 16 adjacent to the ink marks 20 makes it preferable to employ smaller marks 20. Specifically it is desiraple to employ a direct logic with opaque data points, rather than a reverse logic having transparent data points surrounded by an opaque field. Furthermore it is preferred to use ink marks approximately 0.10 inches by 0.18 inches and about 0.10 mils thick.

Figure 5:
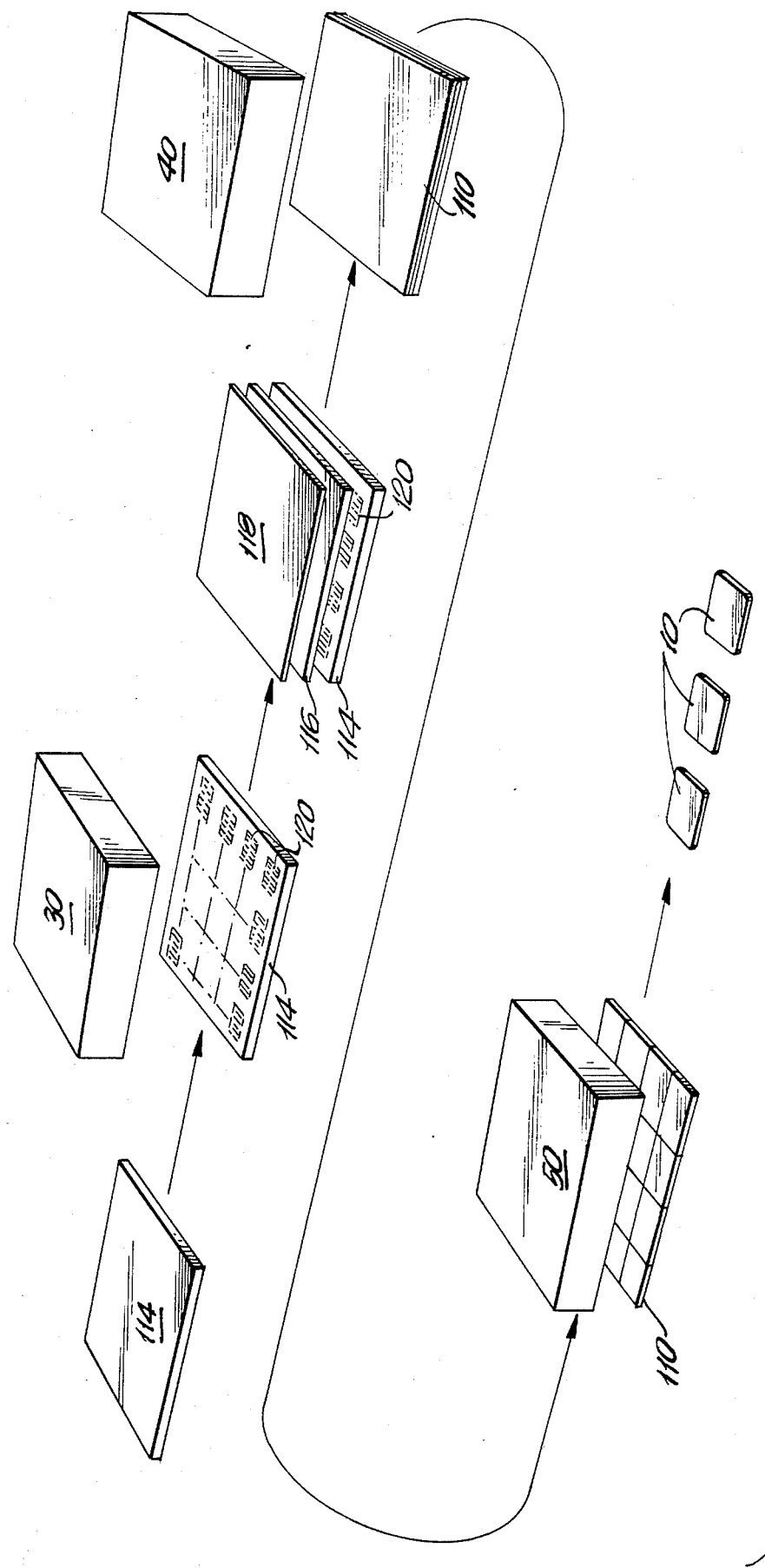
FIG. 5 is a schematic representation of the process for forming the badge of the subject invention.

The process for producing the badge 10 of the subject invention is illustrated schematically in FIG. 5, wherein a sheet of blue plastic material having a thickness of approximately 20 mils is passed to a silk screen printing station 30. As explained above, the sheet 114 of blue PVC material is able to transmit between 8.0 and 8.8% infrared light at 930-950 nm. The sheet of PVC material 14 is of a sufficient size to produce a plurality of badges and preferably about 72 badges. The silk screen station 30 will imprint a plurality of arrays of coded marks 120 onto the sheet 114 at locations thereon that will correspond to the individual badges to be produced from the sheet. As noted above, the ink employed at the silk screening station is a super opaque black silk screening ink, such as ink GBYL-8100 produced by Union Ink Company, Inc. The silk screen station 30 employs a silk screen mesh of minimum 300, and applies the ink to a thickness of approximately 0.10 mil. This blocking ink should transmit no more than 0.08% infrared light at 930-950 nm.

After printing and drying the sheet 114 is placed in an array with sheets 116 and 118 which also are formed from PVC material as explained above. More particularly, the sheet 114 defines the bottom member of the array. Sheet 116 is a red PVC material approximately 15 mils thick which transmits 30-35% infrared light at 930-950 nm. The sheet 116 is placed over the sheet 114 so as to cover the various ink marks 120. Sheet 118 is an approximately 7.5 mils thick white PVC sheet which transmits approximately 5.0-5.5% infrared light at 930-950 nm.

The sheets 114, 116 and 118 of PVC material are directed to laminating station 40 where they are subjected to appropriate heat and pressure to combine the sheets 114, 116 and 118 into an integral member 110. The member 110 is directed to a cutting station 50 where individual cards 10 are cut from the member 110.

In summary, an improved security badge and process for making the same are provided. The badge includes an approximately 20 mil thick layer of blue PVC material which transmits approximately 8.0 to 8.8% infrared light at 930-950 nm; an approximately 15 mil thick layer of red PVC material which transmits 30-35% infrared light at 930-950 nm; and an approximately 7.5 *mil PVC film that transmits* 5.0-5.5% infrared light at 930-950 nm. Data is imprinted on either the red or blue layer by a silk screening process applying an approximately 0.1 mil thickness of an opaque ink which transmits no more than 0.08% infrared light at 930-950 nm. The PVC layers are laminated to one another by appropriate application of heat and pressure to form an integral badge that cannot be delaminated and that securely prevents detection of the code.

While the subject invention has been described with respect to certain preferred embodiments, it is understood that various modifications can be made therein without departing from the spirit of the present invention which should be limited only by the scope of the appended claims.

What is claimed is:

1. A security badge for use with an infrared badge reader, said badge being generally planar in configuration and comprising an integral polyvinylchloride body and at least one infrared blocking mark disposed interiorly of and contiguous with said body, to define at least one coded portion and an uncoded portion, with the coded portion transmitting no more than 0.05% infrared light at 930-950 nanometers and with the uncoded portion being able to transmit approximately between 0.9%-1.5% infrared light at 950 nanometers.

2. A badge as in claim 1 having a thickness of no more than 50 mils.

3. A badge as in claim 1 wherein said blocking mark is formed by an ink which transmits no more than 0.08% infrared light at 930-950 nanometers.

4. A badge as in claim 3 wherein said blocking mark is approximately 0.1 mils thick.

5. A badge as in claim 1 wherein said PVC body compriss a red layer of PVC film and a blue layer of PVC film integrally laminated to one another by heat and pressure, said blocking mark being disposed intermediate said red and blue layers.

6. A badge as in claim 5 further including a white layer of PVC material integrally laminated therein.

7. A badge as in claim 6 wherein the blue PVC film is approximately 20 mils thick, the red PVC film is approximately 15 thick and the white PVC film is approximately 7.5 mils thick.

8. A badge as in claim 7 wherein the blue PVC material transmits 8.0-8.8% infrared light at 930-950 nm, the red layer transmits 30-35% infrared light at 930-950 nm, and the white layer transmits 5.0-5.5% infrared light at 930-950 nm.

9. A badge as in claim 1 wherein said badge transmits approximately 1.0% infrared light at 930-950 nm.

10. A secure badge for use with an infrared badge reader, said badge comprising a blue PVC film approximately 20 mils thick and able to transmit 8.0–8.5% infrared light at 930–950 nm, a red PVC film approximately 15 mils thick and able to transmit 30–35% infrared light at 930–nm and a white PVC film approximately 7.5 mils thick and able to transmit 5.0–5% infrared light at 930–950 nm, said blue, red and white PVC films being laminated to one another under heat and pressure without adhesives to define an integral array of PVC material, infrared blocking marks being disposed intermediate said red and blue layers to define blocking portions on said badge, with the remainder of said badge defining non-blocking portions said blocking portions transmitting no more than 0.05% infrared light at 930–950 nm and said non-blocking portions transmitting approximately 1.0% infrared light at 930–950 nm, whereby said blocking marks define a code which can be read by the infrared badge reader.

11. A process for forming a security badge comprising the steps of:

providing sheets of blue and red PVC film;

silk screen printing infrared blocking marks on either said blue or red PVC film with an ink which transmits no more than 0.08% infrared light at 930–950 nm;

placing said sheets of blue and red PVC film in face-to-face contact with the blocking marks disposed therebetween;

laminating said red and blue films under heat and pressure to form an integral PVC member of said red, and blue films.

12. A process as in claim 11 further comprising the step of laminating a white PVC film to said red or said blue PVC film by application of heat and pressure to form an integral member of said red, blue and white films.

13. A process as in claim 12 further comprising the step of cutting a plurality of badges from said laminated PVC films.

14. A process as in claim 12 wherein the said ink is applied to a thickness of 0.10 mils.

15. A process as in claim 12 wherein said blue PVC film approximately 20 mils thick, said red PVC film is approximately 15 mils and said white PVC film is approximately 7.5 mils thick.

* * * * *